US012264043B2

(12) United States Patent
Besten

(10) Patent No.: US 12,264,043 B2
(45) Date of Patent: Apr. 1, 2025

(54) APPARATUS FOR TRANSPORTING A LOAD, IN PARTICULAR A STAIRLIFT

(71) Applicant: Otolift Trapliften B.V., Bergambacht (NL)

(72) Inventor: Marcel den Besten, Bergambacht (NL)

(73) Assignee: OTOLIFT TRAPLIFTEN B.V., Bergambacht (NL)

( * ) Notice: Subject to any disclaimer, the term of this patent is extended or adjusted under 35 U.S.C. 154(b) by 0 days.

(21) Appl. No.: 18/371,984

(22) Filed: Sep. 22, 2023

(65) Prior Publication Data

US 2024/0101393 A1 Mar. 28, 2024

(30) Foreign Application Priority Data

Sep. 23, 2022 (NL) ...................................... 2033120

(51) Int. Cl.
*B66B 9/08* (2006.01)

(52) U.S. Cl.
CPC .................................. *B66B 9/0838* (2013.01)

(58) Field of Classification Search
CPC ................................ B66B 9/08; B66B 9/0838
See application file for complete search history.

(56) References Cited

U.S. PATENT DOCUMENTS 5,720,364 A * 2/1998 Glover .................. B66B 9/0838 187/245
9,751,725 B2 * 9/2017 Hall ...................... B66B 9/0853
10,519,002 B2 * 12/2019 Cook ........................ B66B 1/30
11,261,060 B2 * 3/2022 Woodhams ........... B66B 9/0838
11,713,213 B2 * 8/2023 Stam ......................... B66B 9/08 187/201
2005/0279580 A1 * 12/2005 Szentistvany ......... B66B 9/0815 187/201
2007/0235265 A1 * 10/2007 Vroegindeweij ..... B66B 9/0838 187/201

(Continued)

FOREIGN PATENT DOCUMENTS

EP 3326955 A1 5/2018
EP 3683180 A1 7/2020
WO 2021219488 A1 11/2021

OTHER PUBLICATIONS

Search Report and Written Opinion for Application No. NL2033120, dated Mar. 12, 2023, 8 pages.

*Primary Examiner* — Michael A Riegelman
(74) *Attorney, Agent, or Firm* — KDW Firm PLLC

(57) ABSTRACT

An apparatus for transporting a load, in particular a stairlift, includes a frame displaceable along a rail, a load carrier rotationally mounted on the frame for rotation around a horizontal axis, an adjusting motor for rotating the load carrier relative to the frame around the horizontal axis, a rotation blocking device for blocking of the load carrier with respect to the frame in a braking operation mode, and a decoupling means to decouple the load carrier from the rotation blocking device and/or the frame from the rotation blocking device so that a limited amount of movement of the load carrier and/or the frame with respect to the rotation blocking device is allowed in the braking operation mode of the rotation blocking device. A resilient member resists at least part of said movement of the load carrier and/or the frame with respect to the rotation blocking device.

18 Claims, 7 Drawing Sheets

(56) References Cited

U.S. PATENT DOCUMENTS

| | | | | |
|---|---|---|---|---|
| 2011/0000744 | A1 * | 1/2011 | Smith | B66B 9/0838 187/202 |
| 2024/0101393 | A1 * | 3/2024 | Besten | B66B 9/0838 |

* cited by examiner

APPARATUS FOR TRANSPORTING A LOAD, IN PARTICULAR A STAIRLIFT

CROSS-REFERENCE TO RELATED APPLICATIONS

This application claims priority to Netherlands patent application serial number 2033120, filed Sep. 23, 2022, titled "Apparatus for Transporting a Load, in Particular a Stairlift," the entirety of which application is incorporated by reference herein.

FIELD

The present invention relates to an apparatus for transporting a load, in particular a stairlift.

BACKGROUND

In such apparatus, particularly a stairlift, a load is transported along a rail from a first position (e.g., first level) to a second position (e.g., second level). Generally, a frame is provided which is displaceable along the rail, and a load carrier is rotationally mounted on the frame. The load carrier can be rotated with respect to the frame, for instance about a horizontal axis. Accordingly, the load carrier can be configured to remain level, whilst the frame moves along the rail which can contain various gradients along its path. In other words, the load carrier preferably maintains a substantially fixed rotation with respect to a direction of the force of gravity, whilst the frame can follow the gradient of the rail. The load carrier can be rotated by means of a motor which is connected to the frame, wherein the rotation shaft of the motor is connected to the load carrier. The motor is for instance an electric motor.

As a stairlift can be used to transport persons as a load, it is important that in case of a failure (e.g., power outage, motor issues) the load carrier does not freely rotate with respect to the frame, as this could cause the load (e.g., a person) to fall off the load carrier (e.g., chair) which may cause injury. Accordingly, such stairlift is generally provided with a rotation blocking device configured to block rotation of the load carrier with respect to the frame in case of emergency, or in a resting position (e.g., unpowered state), or the like. An example of such device is described in patent document WO 2021/219488 A1.

In practice it appears that due to play and/or flexibility (e.g., caused by wear and/or fatigue) in the assembly of the load carrier, rotation blocking device, and/or frame, some relative movement between the load carrier and the frame may be possible in the locked state of the rotation blocking device (also referred to as the braking operation mode). Such movement may be effected by, for instance, loading or unloading of the load carrier. In certain cases, such movement may cause the rotation blocking device to get stuck or jammed which prevents proper functioning of the apparatus.

SUMMARY

It is an object of the present disclosure, amongst others, to at least partially mitigate the issue of improper functioning of the apparatus, as explained above.

In view of the above, according to a first aspect of the present disclosure, an apparatus for transporting a load is provided, in particular a stairlift, the apparatus comprising a frame which is displaceable along a rail, a load carrier which is rotationally mounted on the frame to be rotated around a horizontal axis, an adjusting motor arranged to rotate the load carrier relative to the frame around the horizontal axis, a rotation blocking device for blocking a rotational movement of the load carrier with respect to the frame in a braking operation mode of the rotation blocking device, and a decoupling means configured to decouple the load carrier from the rotation blocking device and/or the frame from the rotation blocking device, such that a limited amount of movement of the load carrier and/or the frame with respect to the rotation blocking device is allowed in the braking operation mode of the rotation blocking device, and a resilient member for resisting at least part of said movement of the load carrier and/or the frame with respect to the rotation blocking device.

The above apparatus is capable of reducing the chance of improper functioning of the apparatus caused by play and/or flexibility between the load carrier and the frame (e.g., due to wear in the assembly of the apparatus) in the braking operation mode of the rotation blocking device. By allowing a limited amount of movement of the load carrier and/or frame with respect to the rotation blocking device, due to the decoupling means, and concurrently resisting at least part of said movement by means of a resilient member, the force inflicted on the assembly by the movement is at least partially absorbed, such that the force is not fully and directly applied to the rotation blocking device, which thus prevents improper functioning (e.g., due to jamming of the rotation blocking device) as described above.

For instance, the rotation blocking device may be in braking operation mode during standstill (e.g., when the apparatus is powered down) or during an emergency stop. Loading and unloading of the load carrier during standstill may cause rotational or translational movement of the load carrier with respect to the frame (e.g., due to play in the adjusting motor, which may be caused by wear). In the prior art, the rotation blocking device may become increasingly stuck (e.g., due to tightening and/or deformation of braking components) due to the force applied on the rotation blocking device caused by the rotational movement, thus leading to improper functioning or even malfunctioning. Loading of the load carrier may for instance entail a person sitting down in the chair (i.e., on the load carrier) at an offset from the rotation axis of the chair (e.g., the rotation axis of the adjusting motor), thus applying a rotational force and movement to the chair and therefore also to the rotation blocking device.

The decoupling means and resilient member of the apparatus according to the first aspect of the disclosure provides a degree of compensation of forces applied to the rotation blocking device through the load carrier. Accordingly, the effect of rotational forces on the rotation blocking device caused by loads applied to the load carrier, particularly in the braking operation mode, is effectively decreased, and in turn the chance of improper functioning (e.g., jamming of the rotation blocking device) is lowered.

As explained above, decoupling means allow a limited amount of movement of the load carrier and/or the frame with respect to the rotation blocking device in the braking operation mode. Particularly, the limited amount of movement may include rotational movement and/or translational movement, such as axial and/or radial movement. The resilient member resists at least part of said limited amount of movement, which may thus include at least part of the rotational movement, and/or at least part of the translational movement, such as at least part of axial and/or radial movement. In other words, rotational movement and/or translational movement, such as axial and/or radial movement, are considered potential parts of said limited amount of movement. In certain examples, the limited amount of movement may include only one of rotational or translational movement. In further examples, the resilient member may resist only one of rotational or translational movement, or even only a part of the aforementioned movements (such as only the radial part of the translational movement.

Preferably, in the apparatus of the first aspect, the decoupling means and/or the resilient member are at least partially integrated in the rotation blocking device. In this context, being integrated in the device also encompasses being mounted on the device, et cetera, as long as at least part of the decoupling means are connected to, provided in, or engaged in any way with the rotation blocking device.

Preferably, in the apparatus of the first aspect, the resilient member is configured for resisting a rotational movement of the load carrier with respect to the frame around the horizontal axis, as part of said limited amount of movement. In other words, the limited amount of moment may include said rotational movement, i.e., a limited amount of rotational movement, of the load carrier and/or the frame with respect to the rotation blocking device, around the horizontal axis or optionally another relevant axis about which the load carrier, rotation blocking device and/or frame can be moved. It is conceivable that the resilient member resists said rotational movement, but not another movement, such as another rotational movement or a translational movement. For instance, the resilient member resists (e.g., absorbs) movement of the load carrier and/or frame in rotation (e.g., in tangential direction with respect to the horizontal axis), but not in translation (e.g., in radial direction with respect to the horizontal axis). In an example, the rotation blocking device specifically blocks rotation of the load carrier with respect to the frame in the braking operation mode, which may for instance be effected by friction between elements of the rotation blocking device. Accordingly, additional torque on the rotation blocking device, due the aforementioned rotational movement of the load carrier, in the braking operation mode, may increase the friction between such elements. The friction may in certain cases become relatively large, such that the rotation blocking device becomes stuck, i.e., it becomes relatively difficult to get the rotation blocking device out of its braking operation mode and back into a normal operation mode wherein the load carrier and frame are allowed to rotate with respect to each other. Thus, by absorbing at least part of the force caused by the rotational movement, this issue can be at least partially mitigated.

Preferably, in the apparatus of the first aspect, the decoupling means comprises mounting holes, provided in the rotation blocking device for connecting the rotation blocking device with the frame and/or the load carrier, the mounting holes being elongated in a tangential direction around the horizontal axis, for allowing said rotational movement. It is preferred that the resilient member is provided in at least one of the mounting holes. For instance, mounting elements (e.g., bolts or rods) may extend in or through the mounting holes for connecting the rotation blocking device with the frame and/or the load carrier. Due to the elongate shape of the mounting holes, the frame and/or load carrier are allowed to rotationally move with respect to the rotation blocking device in the braking operation mode. Preferably, the elongate shape of the mounting holes enables a rotation of the load carrier and/or the frame with respect to the rotation blocking device, about the horizontal axis, of a specified number of degrees in both directions (i.e., in clockwise and counterclockwise directions). For example, the specified number of degrees may be between 0 and 20.0 degrees, such as 2.0, 4.0, 6.0, 8.0, 10.0, 12.0, 14.0, 16.0, or 18.0 degrees, or any value in between.

Preferably, in the apparatus of the first aspect, the load carrier is connected to the adjusting motor by means of fastening elements. The rotation blocking device may comprise a first braking member, configured to be locked and unlocked relative to the frame by the rotation blocking device in the braking operation mode, the first braking member being interposed between the load carrier and the adjusting motor. The mounting holes of the decoupling means may include fastening holes provided in the first braking member which are configured to allow the fastening elements to pass through the first braking member. The mounting holes are thus elongated, such that the assembly of the adjusting motor, which may be mounted to the frame, and the load carrier are allowed to rotate by a limited amount with respect to the first braking member. Preferably, the resilient member is provided in at least one of the fastening holes. The resilient member may be arranged in the at least one fastening hole to engage the respective fastening element in the tangential direction and an inner surface of the at least one fastening hole.

Preferably, in the apparatus of the first aspect, an alignment pin is arranged on the adjusting motor, wherein the mounting holes of the decoupling means include an alignment hole provided in the first braking member which configured to receive the alignment pin, and the resilient member is arranged in the alignment hole to engage the alignment pin in the tangential direction and an inner surface of the alignment hole.

The elongated shape of the fastening holes and/or alignment hole allows for some rotational movement between the first braking member and the load carrier. Accordingly, when a rotational force is applied to the load carrier in the locked state, the fastening elements and/or the alignment pin can move within the elongated holes in tangential direction, such that a relatively small relative rotational movement of the load carrier with respect to the first braking member is possible. The resilient member resists this relative rotational movement when the first braking member is locked. In addition, the resilient member causes the alignment pin to be re-centered in the alignment hole upon the first braking member being unlocked, and/or causes a re-centering of the fastening elements in the fastening holes. Naturally, in case the rotational force is removed before the first braking member is unlocked (in a normal operation mode of the rotation blocking device), the resilient member will re-center the pin and/or fastening elements (and thus the load carrier) with respect to the first braking member as well. In other words, the load carrier is allowed to rotate slightly with respect to the rotation blocking device in a braking operation mode, and the load carrier and the first braking member are automatically re-centered with respect to each other in a normal operation mode wherein the first braking member is unlocked. Accordingly, the issue of improper functioning of the rotation blocking device is effectively mitigated.

Preferably, in the apparatus of the first aspect, the rotation blocking device comprises two resilient members, each engaging the alignment pin and opposite inner surfaces of the alignment hole, and/or the at least one fastening element and opposite inner surfaces of the associated fastening hole. Preferably, the two resilient members are substantially identical, such that the alignment pin and/or at least one fastening element is biased towards the center of, respectively, the alignment hole and/or fastening hole.

Preferably, in the apparatus of the first aspect, the resilient member is a spring, preferably a compression spring. The spring can for instance be made of a metal, or a plastic, fiber-reinforced plastic, an elastic material such as rubber, or other suitable materials.

Preferably, in the apparatus of the first aspect, the rotation blocking device further comprises spacers located in the fastening holes which are configured to be movable within the fastening holes in the tangential direction and to receive the fastening elements. The spacers essentially act as bearing within the fastening holes, such that the fasteners do not directly contact the inner surfaces of the fastening holes. This may prevent damage to the fastening holes, for instance when the fastening element have sharp protrusions, such as external screw thread.

Preferably, in the apparatus of the first aspect, the first braking member is shaped as an annulus and is substantially concentric, and preferably coaxial, with the horizontal axis. The horizontal axis is preferably coaxial with a shaft of the adjustment motor. Preferably, a shaft of the adjustment motor extends through the center of the annulus-shaped first braking member, such that a distal end of the shaft, distal to the adjustment motor, can be connected with the load carrier.

Preferably, in the apparatus of the first aspect, the rotation blocking device further comprises a second braking member connected to the frame, a third braking member arranged between the first braking member and the second braking member, and a movable retaining member which holds the third braking member and which is arranged to be moved relative to the second braking member, wherein the first braking member has a primary braking surface which is strip shaped and extends along at least a section of a circle around the horizontal axis, wherein the second braking member has a secondary braking surface which extends at a distance from the primary braking surface at an angle in such manner that the distance between the two surfaces varies, thereby forming a substantially wedge-shaped gap between the primary surface and the secondary surface having a wider part and a narrower part, the wedge-shaped gap widening in the tangential direction around the horizontal axis, wherein in a normal operation mode of the rotation blocking device, wherein the first braking member is unlocked relative to the frame, the third braking member is held in a fixed position relative to the second braking member by the retaining member such that it is positioned in the wider part of the wedge-shaped gap where it cannot engage both the primary braking surface and the secondary braking surface at the same time, and wherein in the braking operation mode of the rotation blocking device, wherein the first braking member is locked relative to the frame, the retaining member is arranged to be moved relative to the second braking member such that the third braking member moves to the narrower part of the wedge-shaped gap, thereby engaging both the primary braking surface and the secondary braking surface and blocking rotation of the second braking member in the tangential direction relative to the first braking member.

The resilient member and decoupling means, which may include the elongated fastening holes and alignment hole of the first braking member, aid in preventing the third braking member to become increasingly jammed in the narrower part of the wedge-shaped gap.

Preferably, in the apparatus of the first aspect, the movable retaining member is designed such that it forces the third braking member to move to the narrower part of the wedge-shaped gap when the retaining member is moved relative to the second braking member in the braking operation mode. In other words, the movable retaining member can be actuated so as to engage and disengage the braking action of the rotation blocking device, by actively moving the third braking member.

Preferably, in the apparatus of the first aspect, the rotation blocking device comprises a multitude of first and secondary braking surfaces forming substantially wedge-shaped gaps and a multitude of third braking members, each extending in a respective substantially wedge-shaped gap. This may provide redundancy as well as the possibility to block rotation in both rotational directions.

Preferably, in the apparatus of the first aspect, the third braking member has the form of a cylinder, and the axis of the cylinder extends parallel to both the primary and secondary braking surfaces.

Preferably, in the apparatus of the first aspect, the retaining member is held in position in normal operation by the force of an electrically powered electromagnet. Preferably, when the electromagnet is not powered, the retaining member automatically returns to its position in the braking operation mode. Accordingly, in case of power outage, the rotation blocking device automatically blocks rotation of the load carrier with respect to the frame.

Preferably, in the apparatus of the first aspect, a resilient biasing member is arranged to move the retaining member from the fixed position in normal operation mode to the braking operation mode. This biases the retaining member to its position in the braking operation mode, and in turn thus biases the third braking member into its position in the braking operation mode, wherein the third braking member moves to the narrower part of the wedge-shaped gap, thereby engaging both the primary braking surface and the secondary braking surface and blocking rotation of the second braking member in the tangential direction relative to the first braking member.

Preferably, in the apparatus of the first aspect, the frame is provided with support, guide and drive means arranged to engage the rail. Suitable means are known to the skilled person to allow the frame to move along the rail.

Preferably, the apparatus of the first aspect further comprises position-maintaining means for maintaining the load carrier in a predetermined rotational position relative to the direction of gravity, which position-maintaining means comprise at least the adjusting motor. The position-maintaining means may further comprise an orientation sensor, such as a rotary sensor, accelerometer, proximity sensor, or the like, from which the rotational position of the load carrier with respect to the direction of gravity may be determined, either directly or indirectly. The position-maintaining means may for instance comprise a controller, which is configured to receive information from the orientation sensor, and on the basis of this information control the adjusting motor for maintaining the load carrier in the predetermined rotational position.

In a second aspect of the present disclosure, the apparatus is a stairlift, which is preferably configured to transport the load from a first level to a second level. Preferably, the first level is the bottom of a staircase, and the second level is the top of the staircase.

BRIEF DESCRIPTION OF THE DRAWINGS

The present invention will hereinafter be elucidated by means of illustrative examples with reference to the attached drawings, wherein.

DETAILED DESCRIPTION

Figure 1:
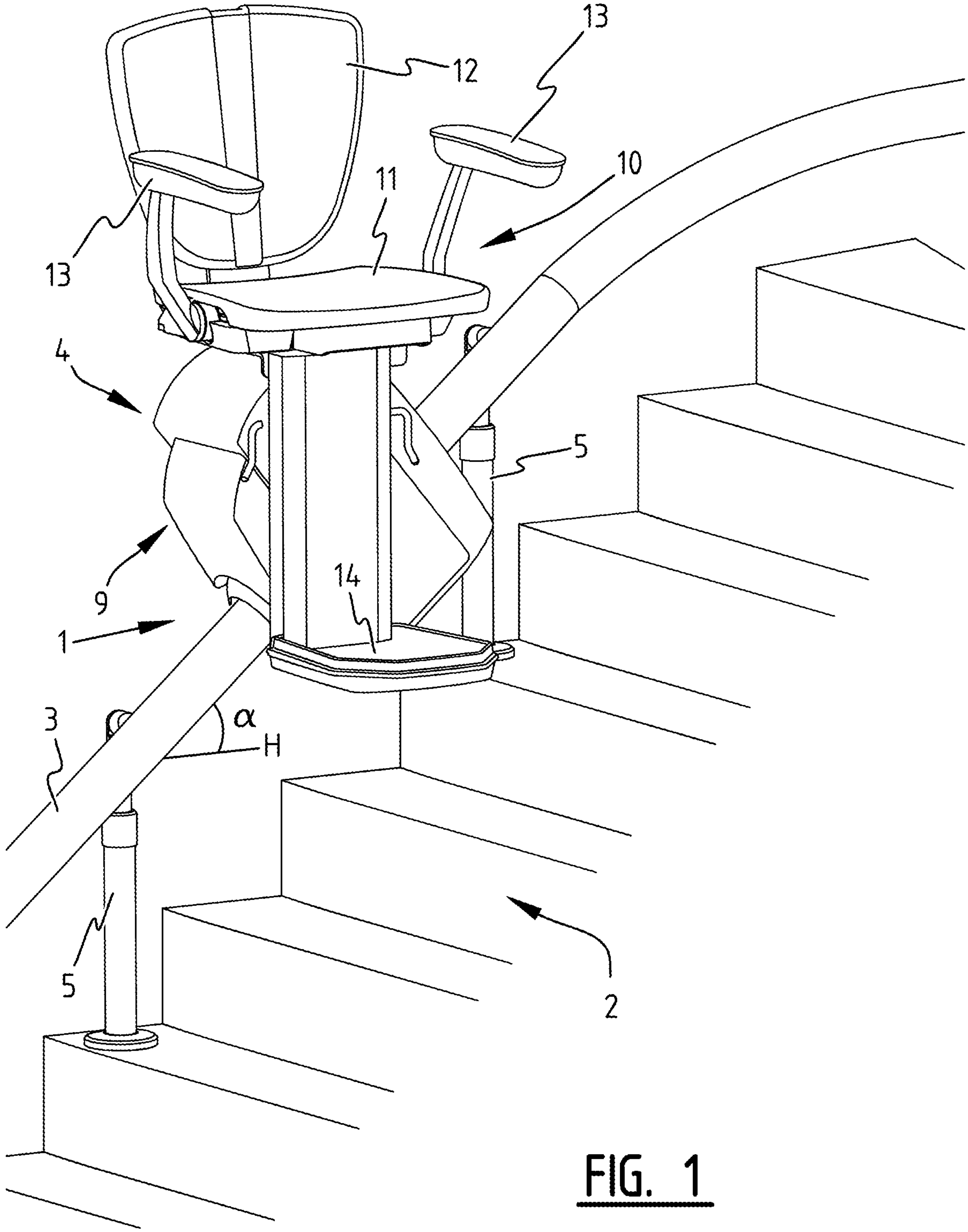
FIG. 1 shows a perspective view of an exemplary stairlift.

FIG. 1 shows an exemplary system 1 configured for transporting a load, such as a person, from a first level to a second level. In the present example, the first level is for instance the bottom of the shown staircase 2, and the second level is the top of the staircase 2. The system 1 may comprise a rail 3 which is placed along a staircase 2 and which encloses an angle $\alpha$ with the horizontal H, and an apparatus 4, also referred to as stairlift 4, movable along rail 3 for transporting the load between the different levels. Rail 3, which in the shown example has a round cross-section, is supported by a number of posts 5 which are arranged distributed along staircase 2 and which are fixed to a protruding part extending along rail 3. Rail 3 is further provided with a propelling part in the form of a gear rack (not shown). Stairlift 4 comprises a frame 9 which is displaceable along rail 3 and on which a load carrier 10 is mounted, here in the form of a chair with a seat 11, back rest 12, armrests 13 and a footrest 14.

Chair 10 is connected to frame 9 by a rotatable shaft and fixation means for rotating around a horizontal axis, and arranged in frame 9 and carrier 10 is a level maintaining mechanism consisting of, among other parts, of an adjusting motor connected to said shaft so that the position of chair 10 can be kept constant at all times irrespective of the inclination of rail 3.

Figure 2:
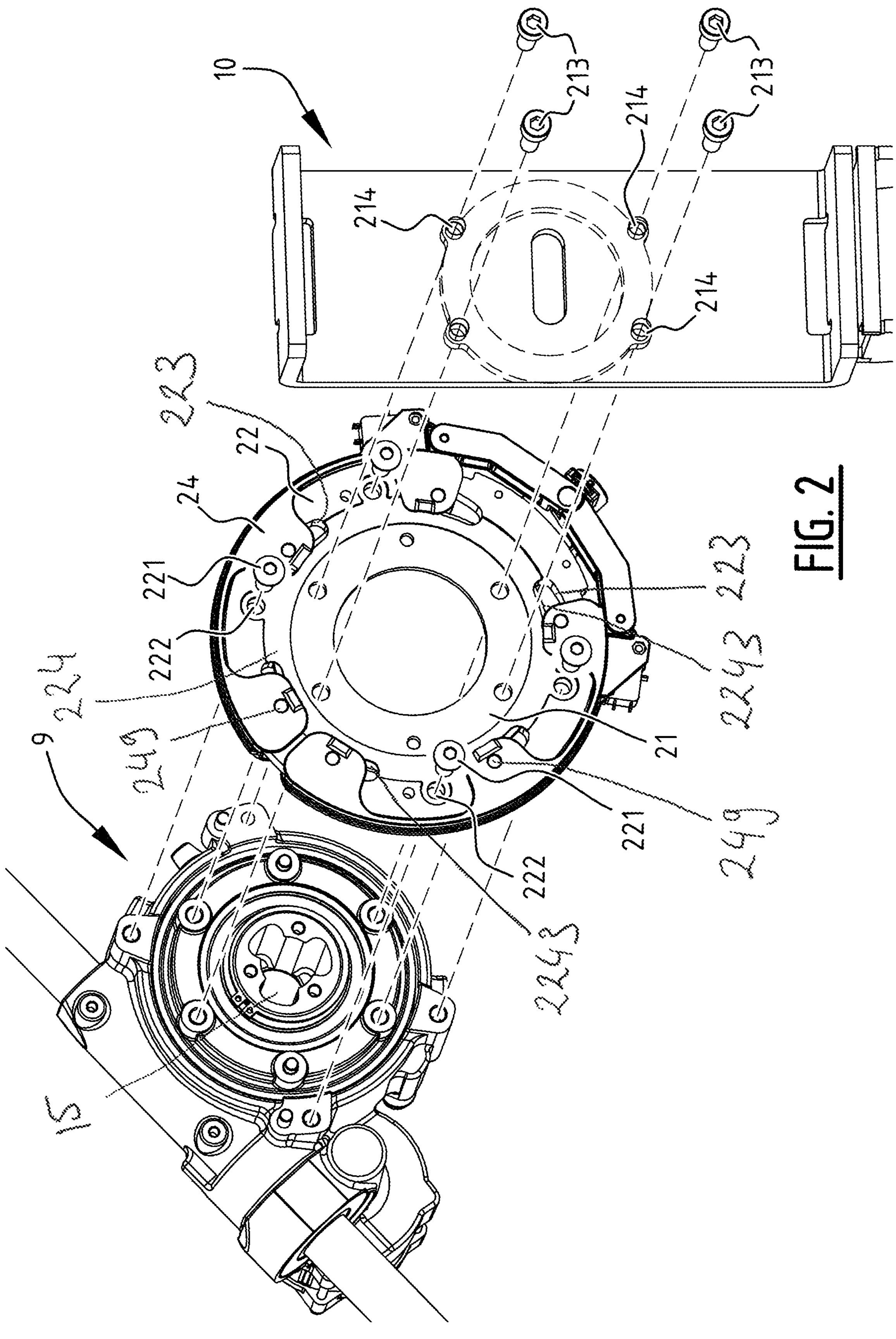
FIG. 2 shows an exploded perspective view of a displaceable frame and a carrier for an exemplary stairlift as shown in FIG. 1, with an exemplary rotation blocking device mounted therebetween.

FIG. 2 shows a rotation blocking device disposed between the frame 9 and the load carrier 10, according to an example which is useful for understanding the claimed invention. The rotation blocking device comprises a first braking member 21, a second braking member 22, a plurality of third braking members 23 (see FIGS. 3-7), and a retaining member 24 for holding the third braking members 23 in position.

The first braking member 21 comprises a cylindrical outer surface 212 (see FIGS. 3-7) extending around the hollow shaft (not shown) which is to be placed in the hollow shaft socket 15. The first braking member 21 is rigidly connected to the load carrier 10 by bolts 213 extending through holes 214 in said body 10.

The second braking member 22 comprises a substantially cylindrical body extending around the cylindrical part 212 of the first braking member 21, such that it can rotate relative thereto. The second braking member 22 is rigidly connected to the frame 9 by bolts 221 extending through holes 222. A guide ring 224, which encloses the first braking member 21 in the axial direction, is provided on each side of the second braking member 22.

Figure 3:
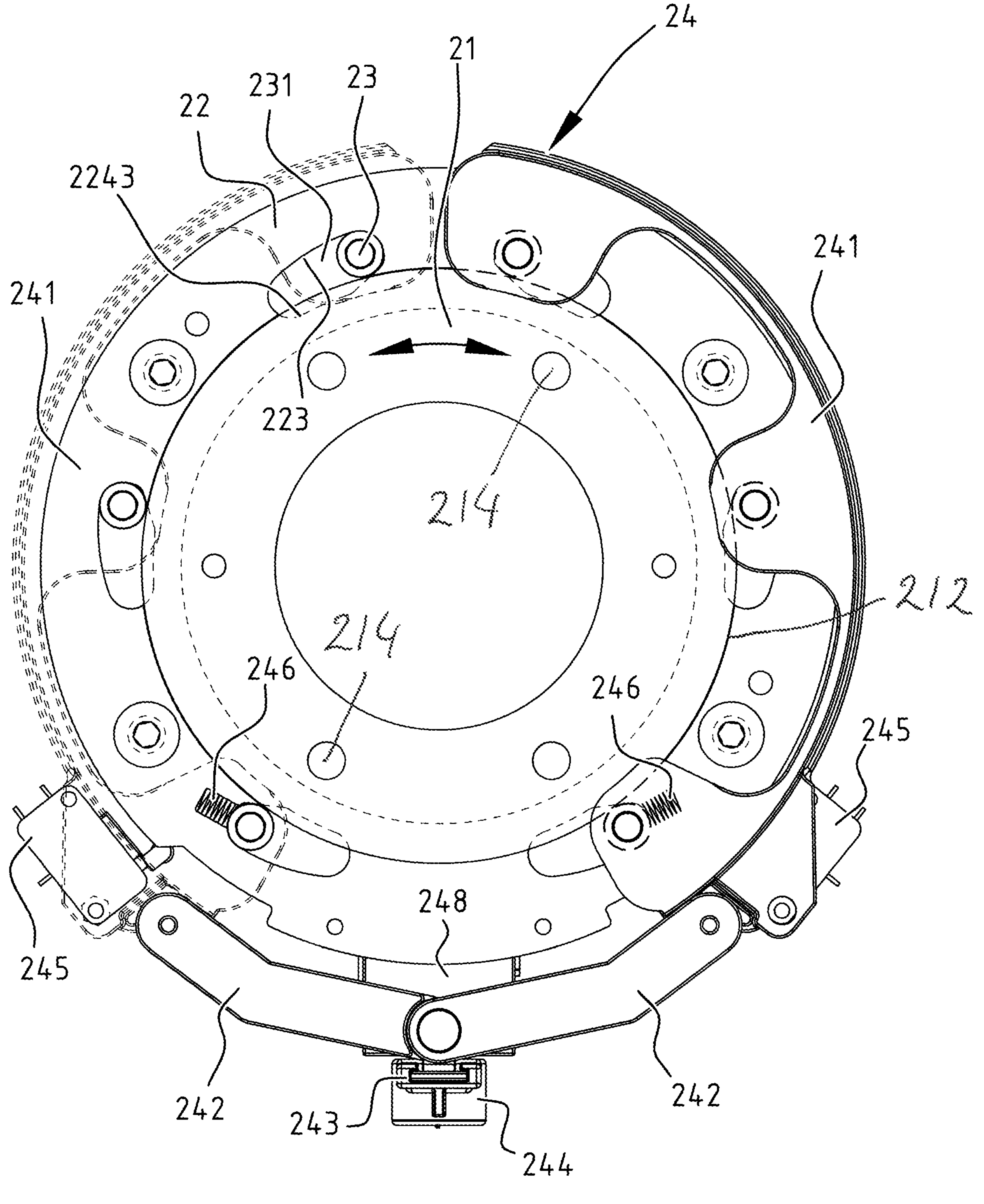
FIG. 3 shows a schematic front view of the rotation blocking device of FIG. 2 in normal operation mode.
Figure 4:
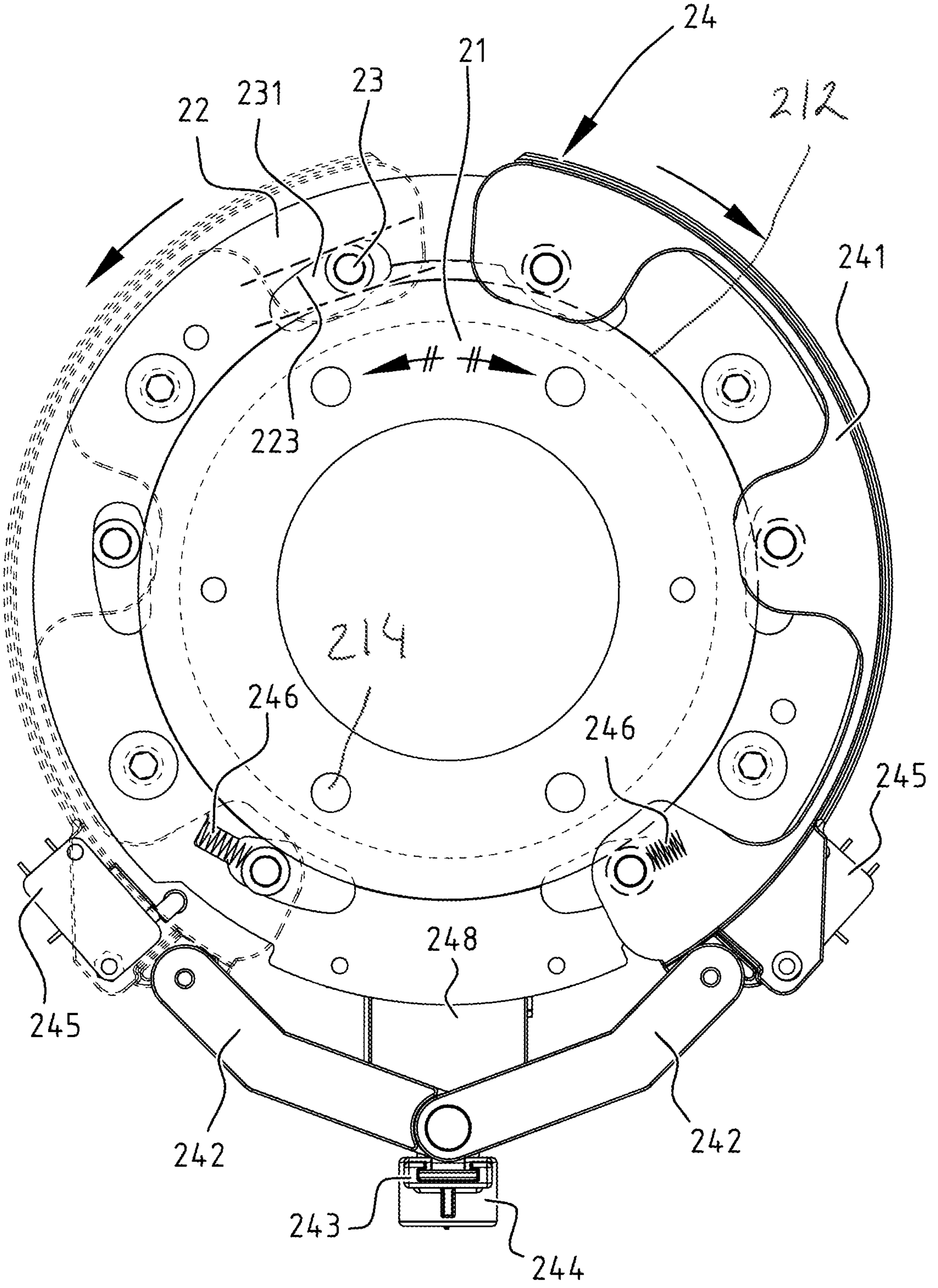
FIG. 4 shows a schematic front view of the rotation blocking device of FIG. 2 in resting or non-operational mode.
Figure 5:
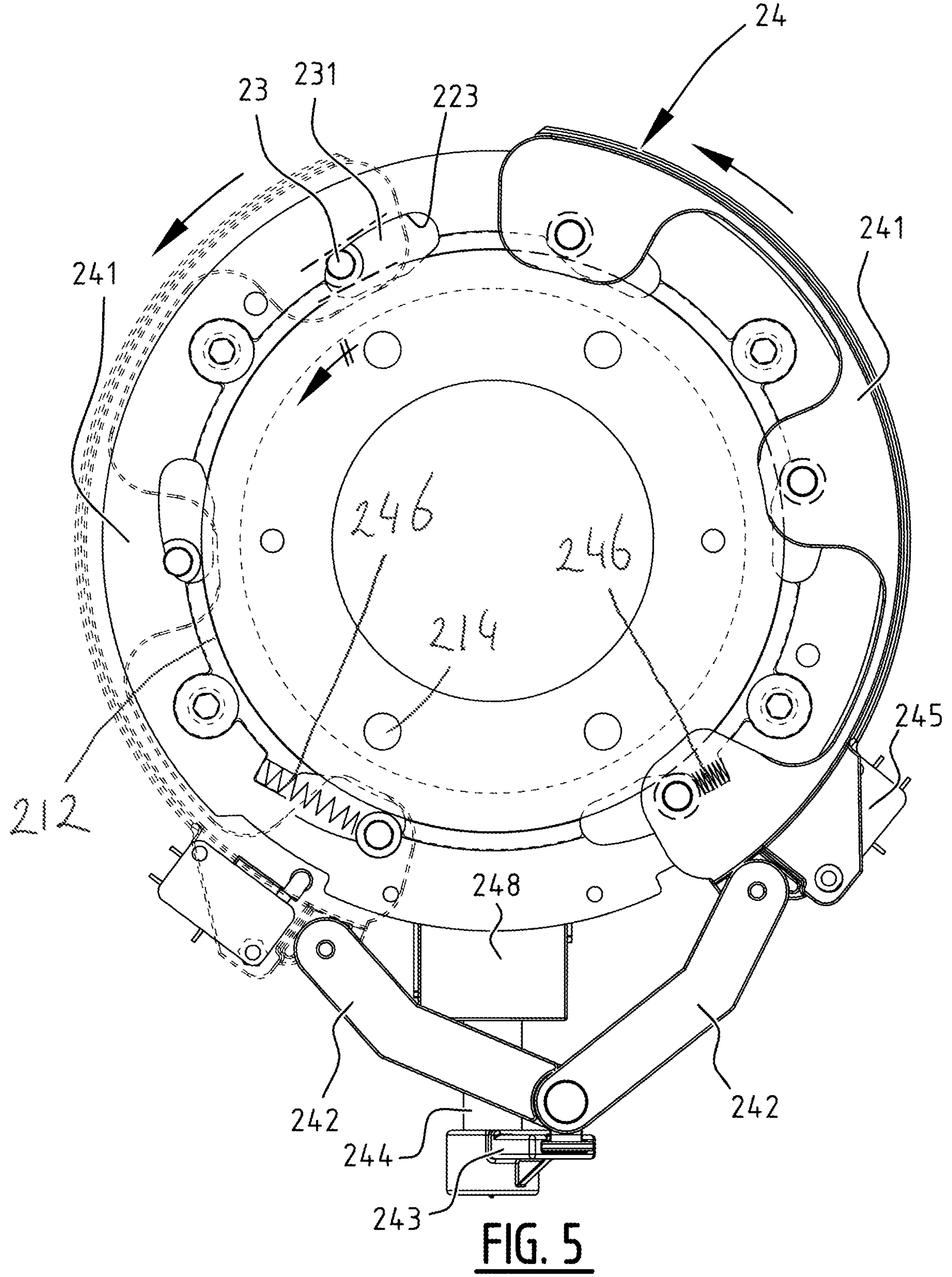
FIG. 5 shows a schematic front view of the rotation blocking device of FIG. 2 in braking operation mode.

The second braking member 22 comprises recesses 223 in its inner circumferential wall around the cylindrical outer surface 212 of the first braking member 21, such that the surface of said recesses face the outer surface 212. As shown in FIGS. 3-5, the surface of the recesses 223 is shaped such that the surface of each recess 223 and said surface of the cylindrical part 212 form substantially wedge-shaped gaps 231, having a wider part in its upper region and a narrower part in its lower region. The guide ring 224 of the braking member 22 has a substantially circular shape, and comprises recesses which form guides 2243 that are shaped such that can they engage both outer ends of the third braking members 23 and guide the third braking members 23 away from the surface 212 when they are moved by the retaining member 24 to the upper extreme positions, as shown in FIG. 3 and as explained below.

The third braking members 23 have a cylindrical main body and a shaft extending from both ends. The holders 241 of the retaining member 24 have holes 249 in which the shafts of the third braking members 23 extend. The braking members 23 can freely rotate around the shafts.

The retaining member 24 comprises two holders 241, two lateral arms 242, a link 243 and a shaft 244. The shaft 244 is mounted on the load carrier 10 in such a manner that it can move in its axial direction, which direction is perpendicular to the horizontal axial direction of the first braking member 21 and the second braking member 22, and which axial direction is, in the example as shown, the vertical direction. The link 243 is attached to the shaft 244 and extends perpendicular to the shaft and is allowed to rotate around the axis of the shaft 244. One end of each of the two lateral arms 242 is attached to the outer end of the link 243 in such a manner that they can rotate around a horizontal axis which is parallel to the horizontal axial direction of the first braking member 21 and the second braking member 22, and such that they can rotate about an axis which is parallel to said axis of the shaft 244. The other outer ends of the lateral arms 242 are each attached to a respective holder 241, in such a manner that the holders 241 can rotate with respect to the arms 242 about an axis which is parallel to the horizontal axial direction of the first braking member 21 and the second braking member 22.

The holders 241 are for instance made of a flexible material, such as a flexible plastic material, such that they can easily deform when forces are exerted on different parts of the holder 241, in particular by the third braking members 23.

Detectors such as micro switches 245 detect the angular mutual orientation between the arms 242 and the holders 241, whereby an emergency braking action may be detected, such that the stairlift 4 may be put out of operation until maintenance has occurred.

The shaft 244, the holders 241 and the third braking members 23 that they hold are movable between two respective extreme positions. Two or more biased springs 246 may be provided, of which one end pushes against a third braking member 23, one on the right side and one the left side as seen in FIGS. 3-5, and the other end pushes against a stop surface in the recess 223 of the second braking member 22, thereby pushing said third braking member 23 and thereby the retaining member 24, that hold all third braking members 23, towards their first extreme position. Furthermore, an electromagnet 248 is provided, which is mounted on the load carrier 10. When, in the normal operation mode, the electromagnet 248 is powered, it pulls the shaft 244 of the retaining member 24 in its second extreme (upper) position, against the force of spring 246, thereby moving the holders 241 of the retaining member 24 and the third braking members 23 towards their second extreme position. If the electromagnet is not powered, the shaft 244 is allowed to move, and the spring 246 may push the holders 241 of the retaining member 24 and the third braking members 23 back towards their first extreme (lower) position.

Even though the first braking member 21 and its functions are here shown as being present on the inner ring-shaped member, and the second braking member 22 and its function are here shown as being present on the outer ring-shaped member, the locations along with the functions of the first and second braking member 21, 22 may be envisaged to be switched, such that, for example, the first braking member 21 and its functions are embodied by the outer ring-shaped member and the second braking member 22 and its functions are embodied by the inner ring-shaped member.

In the normal operation mode, as shown in FIG. 3, when the retaining member 24 is forced to be in the upper position by the electromagnet 248, and the retaining member 24 carry the shafts of the third braking members 23 such that their main bodies are forced to extend in the wider parts of the wedge-shaped gaps 231 and the third braking members are (just) lifted from the surface 212 by the guides 2243. In that position the first braking member 21 and the second braking member 22, and thereby the frame 9 and the load carrier 10, can freely rotate relative to each other.

As shown in FIG. 4, in a resting or non-operational mode when the stairlift is not moving, the electromagnet is unpowered, and the retaining member 24 with the holders 241 is forced towards the lower position by the spring 246, whereby the shafts of the third braking members 23 move towards the narrower part of the wedge-shaped gaps 231 at both the left and right sides of FIG. 4, such that the cylindrical surfaces of the main bodies of the third braking members 23 each touch both the surface 212 of the first braking member 21 and the surface 223 of the second braking member 22. In that position the friction of the main bodies of the third braking members 23, prevents rotation between the first braking member 21 and the second braking member 22, and thereby the frame 9 and the load carrier 10.

In the emergency braking operation mode the electromagnet is also unpowered, for instance in reaction to a signal from a sensor that detects tilting of the load carrier, and the retaining member 24 with the holders 241 is first forced towards the lower position by the spring 246, as in the resting mode of FIG. 4, whereby the shafts of the third braking members 23 move to the narrower part of the wedge-shaped gaps 231 at both the left and right sides. However, due to (undesired) rotation of the load carrier 10 and the first braking member 21 attached to it, the third braking members 23 on either the left or the right side (depending on the direction of rotation of the first braking member 21) will move further into the narrow side of the gap, which may cause deformation of the materials of for instance the second braking member (as shown in FIG. 5).

Said movement of the third braking members 23 will cause their holder 241 to move and thereby also move the other holder 241 of the retaining member 24 with the other third braking members 23 as shown in FIG. 5. In that position the friction of the main bodies of the third braking members 23, and the possible deformation of materials, prevent rotation between the first braking member 21 and the second braking member 22, and thereby the frame 9 and the load carrier 10.

Thereby the undesired rotation of the load carrier 10 is stopped.

The flexibility of the holders 241 allow that in the braking operation mode all the third braking members 23 in the respective holder can and will be engaged by the surface 212 of the first braking member 21 and the respective surfaces 223 of the second braking member 22, as they are not necessarily held in a mutually fixed position as would be the case with a stiff retaining member.

Figure 6:
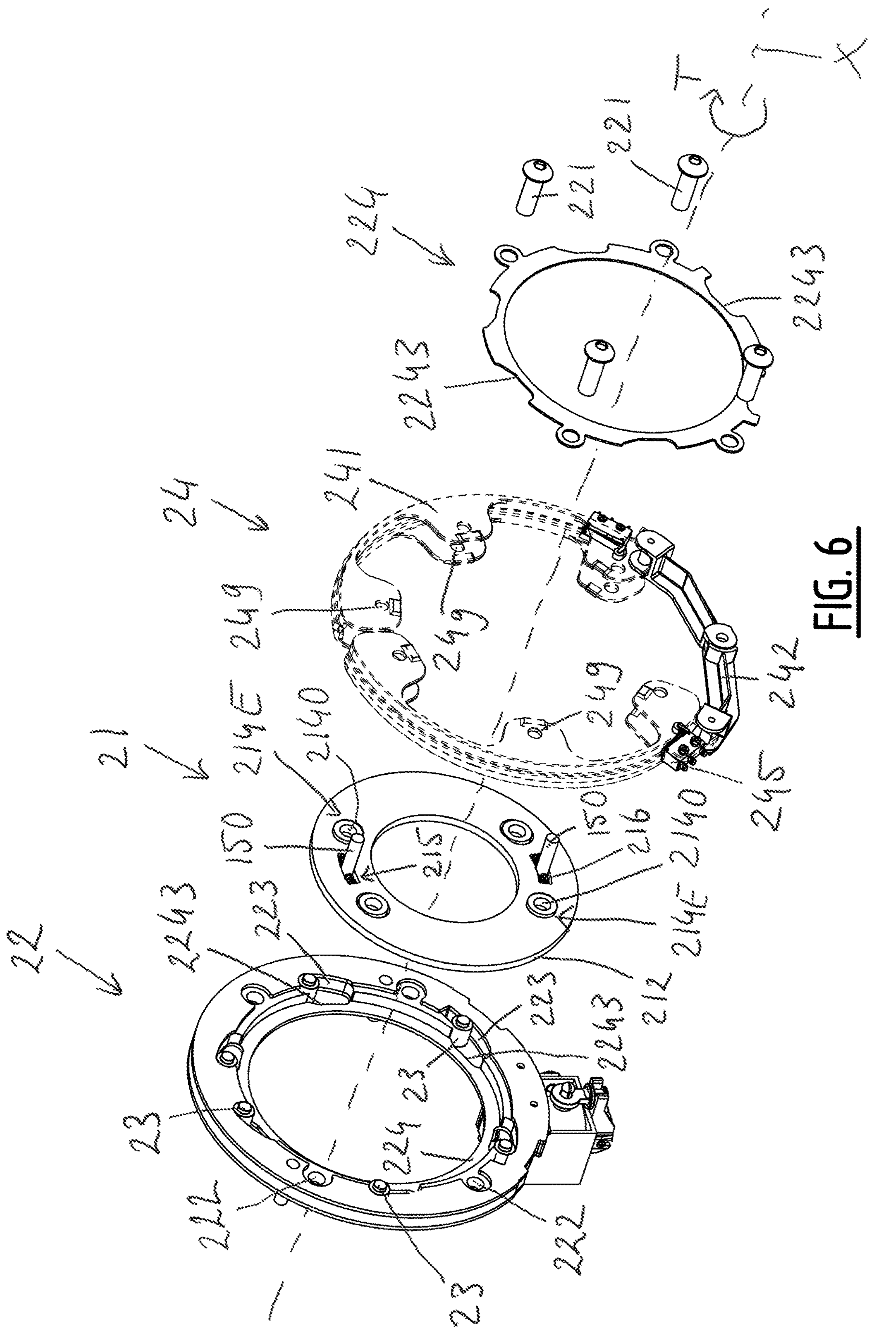
FIG. 6 shows an exploded perspective view of an example of the rotation blocking device of the apparatus of the first aspect of the disclosure.
Figure 7:
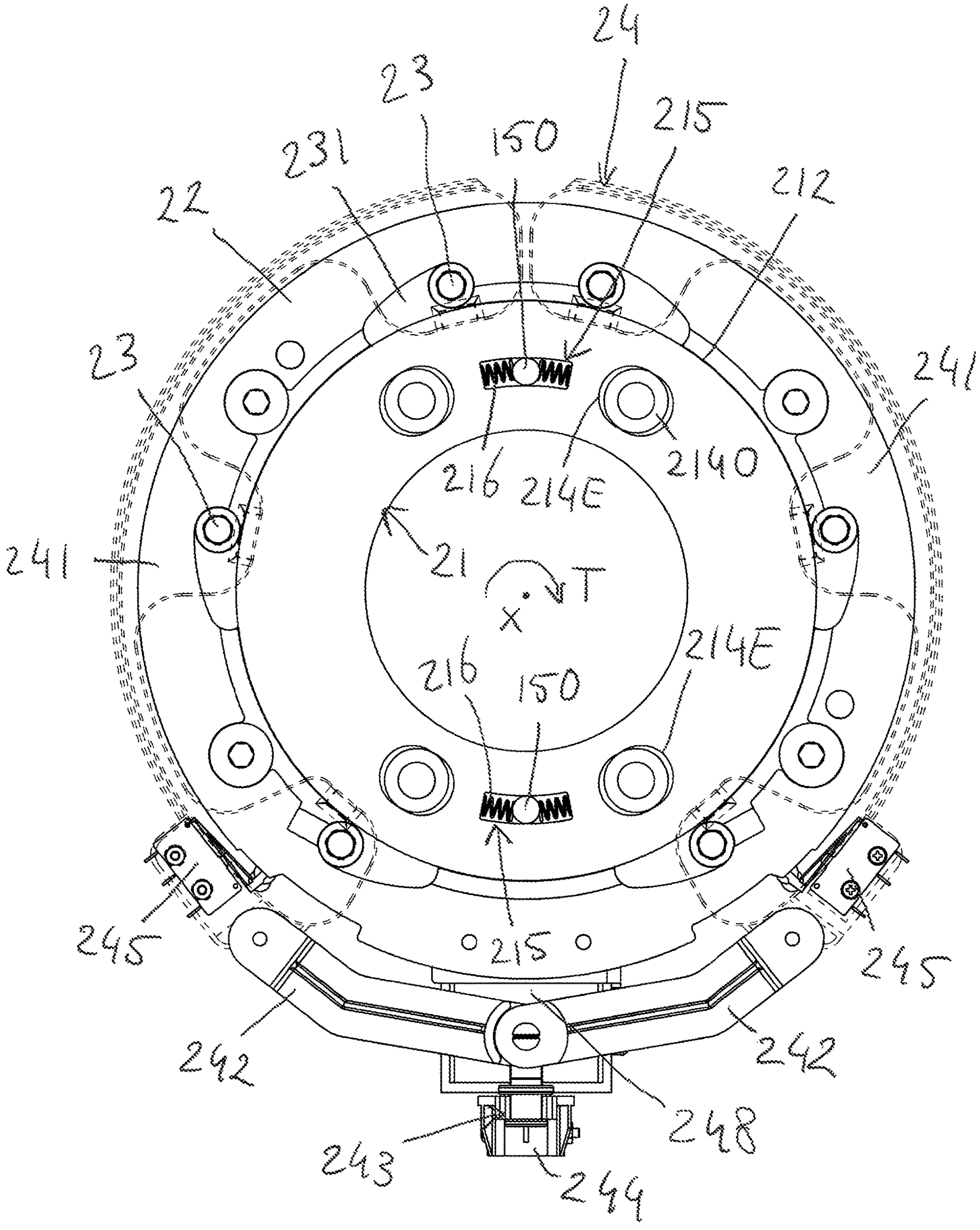
FIG. 7 shows a schematic front view of the rotation blocking device of FIG. 6.

In FIGS. 6 and 7, an exemplary rotation blocking device of the apparatus 4 of the first aspect of the disclosure is shown. Elements that are similar or identical to the device of FIGS. 2-5 are denoted with the same numerals. The main difference of the rotation blocking device of the apparatus 4 of FIGS. 6 and 7 with respect to the one of FIGS. 2-5 is related to the first braking member 21.

The first braking member 21 is provided with fastening holes 214E which are elongated as compared to the holes 213 of FIGS. 2-5. The elongation of the fastening holes 214E is substantially in the tangential direction T around the horizontal axis X. The holes 214E are provided with spacers 2140, which have roughly a washer shape. The spacers 2140 are configured to receive the fastening elements 213 (see FIG. 2) with which the load carrier 10 can be fastened to the frame 9 (particularly to the adjusting motor). The spacers 2140 can move within the holes 214E, such that the fastening elements 213 can move in tangential direction T relative to the first braking member 21.

The first braking member 21 is further provided with two alignment holes 215 which are configured to receive alignment pins 150 of the adjustment motor. The alignment holes 215 are elongated in tangential direction T, such that the alignment pins 150 can move in tangential direction T relative to the first braking member 21. The alignment pins 150 are further biased towards the center of the alignment holes 215 through resilient members, particularly compression springs 216. As both the fastening elements 213 positioned through the spacers 2140 and the alignment pins 150 are rigidly connected to the adjustment motor, the fastening elements 213 and spacers 2140 are also biased towards the center of the fastening holes 214E.

When the first braking member 21 is locked by engagement of the third braking members 23, a rotational force applied to the load carrier 10 will cause movement of the fastening elements 213 and the alignment pins 150 in fastening holes 214E and alignment holes 215, respectively. This movement is damped through the springs 216 acting against the movement of the alignment pins 150 in the alignment holes 215, until the relevant springs 216 are fully compressed. This means that the effect of the rotational force applied to the load carrier 10 on the clamping of the third braking member 23 between the first and second braking members 21, 22 is decreased, as the rotational force is partially absorbed by the springs 216. Accordingly, a rotational force applied to the load carrier 10 in the braking operation mode of the rotation blocking device is not directly transferred to the braking mechanism formed by the first, second and third braking members 21, 22, 23. Accordingly, the chance that the braking mechanism becomes jammed or stuck to a certain degree or wear such as deformations, due to such rotational force applied to the load carrier 10, is effectively decreased. When the first braking member 21 is released (normal operation mode), the springs 216 cause the alignment pins 150 and fastening elements 213 to re-center in the alignment holes 215 and fastening holes 214E, respectively.

In accordance with the above, regarding FIGS. 6 and 7, the elongate fastening holes 214E and elongate alignment holes 215 may form part of an example of a decoupling means of the first aspect of the present disclosure.

The illustrative embodiments or examples described above are not to be construed as limiting the scope of protection, which is determined by the appended claims.

The invention claimed is:

1. An apparatus for transporting a load, comprising:

a frame displaceable along a rail;

a load carrier which is rotationally mounted on the frame to be rotated around a horizontal axis;

an adjusting motor arranged to rotate the load carrier relative to the frame around the horizontal axis;

a rotation blocking device for blocking a rotational movement of the load carrier with respect to the frame in a braking operation mode of the rotation blocking device;

a decoupling means configured to decouple the load carrier from the rotation blocking device and/or the frame from the rotation blocking device, such that a limited amount of movement of the load carrier and/or the frame with respect to the rotation blocking device is allowed in the braking operation mode of the rotation blocking device, and a resilient member for resisting at least part of said movement of the load carrier and/or the frame with respect to the rotation blocking device;

wherein the resilient member is configured for resisting a rotational movement of the load carrier with respect to the frame around the horizontal axis, as part of said limited amount of movement; and wherein the decoupling means comprises mounting holes, provided in the rotation blocking device for connecting the rotation blocking device with the load carrier and/or the frame, the mounting holes being elongated in a tangential direction around the horizontal axis for allowing said rotational movement.

2. The apparatus of claim 1, wherein the decoupling means and/or the resilient member are at least partially integrated in the rotation blocking device.

3. The apparatus of claim 1, wherein the resilient member is provided in at least one of the mounting holes.

4. The apparatus of claim 1, wherein:

the load carrier is connected to the adjusting motor by means of fastening elements;

the rotation blocking device comprises a first braking member, configured to be locked and unlocked relative to the frame by the rotation blocking device in the braking operation mode, the first braking member being interposed between the load carrier and the adjusting motor; and the mounting holes of the decoupling means include fastening holes provided in the first braking member which are configured to allow the fastening elements to pass through the first braking member.

5. The apparatus of claim 4, wherein:

an alignment pin is arranged on the adjusting motor;

the mounting holes of the decoupling means include an alignment hole provided in the first braking member which is configured to receive the alignment pin; and the resilient member is arranged in the alignment hole to engage the alignment pin in the tangential direction and an inner surface of the alignment hole.

6. The apparatus of claim 5, wherein the rotation blocking device comprises two resilient members, each engaging the alignment pin and opposite inner surfaces of the alignment hole.

7. The apparatus of claim 5, wherein the resilient member is a spring.

8. The apparatus of claim 4, wherein the rotation blocking device further comprises spacers located in the fastening holes which are configured to be movable within the fastening holes in the tangential direction and to receive the fastening elements.

9. The apparatus of claim 4, wherein the first braking member is shaped as an annulus and is substantially concentric with the horizontal axis.

10. The apparatus of claim 4, wherein the rotation blocking device further comprises:

a second braking member connected to the frame;

a third braking member arranged between the first braking member and the second braking member; and a movable retaining member which holds the third braking member and which is arranged to be moved relative to the second braking member, wherein the first braking member has a primary braking surface which is strip shaped and extends along at least a section of a circle around the horizontal axis, wherein the second braking member has a secondary braking surface which extends at a distance from the primary braking surface at an angle in such manner that the distance between the two surfaces varies, thereby forming a substantially wedge-shaped gap between the primary surface and the secondary surface having a wider part and a narrower part, the wedge-shaped gap widening in the tangential direction around the horizontal axis, wherein in a normal operation mode of the rotation blocking device, wherein the first braking member is unlocked relative to the frame, the third braking member is held in a fixed position relative to the second braking member by the retaining member such that it is positioned in the wider part of the wedge-shaped gap where it cannot engage both the primary braking surface and the secondary braking surface at the same time, and wherein in the braking operation mode of the rotation blocking device, wherein the first braking member is locked relative to the frame, the retaining member is arranged to be moved relative to the second braking member such that the third braking member moves to the narrower part of the wedge-shaped gap, thereby engaging both the primary braking surface and the secondary braking surface and blocking rotation of the second braking member in the tangential direction relative to the first braking member.

11. The apparatus of claim 10, wherein the movable retaining member is designed such that it forces the third braking member to move to the narrower part of the wedge-shaped gap when the retaining member is moved relative to the second braking member in the braking operation mode.

12. The apparatus of claim 10, wherein the rotation blocking device comprises a multitude of first and secondary braking surfaces forming substantially wedge-shaped gaps and a multitude of third braking members, each extending in a respective substantially wedge-shaped gap.

13. The apparatus of claim 10, wherein the third braking member has the form of a cylinder, and the axis of the cylinder extends parallel to both the primary and secondary braking surfaces.

14. The apparatus of claim 10, wherein the retaining member is held in position in normal operation by the force of an electrically powered electromagnet.

15. The apparatus of claim 10, wherein a resilient biasing member is arranged to move the retaining member from the fixed position in normal operation mode to the braking operation mode.

16. The apparatus of claim 1, wherein the frame is provided with support, guide and drive means arranged to engage the rail.

17. The apparatus of claim 1, further comprising position-maintaining means for maintaining the load carrier in a predetermined rotational position relative to the direction of gravity, which position-maintaining means comprise at least the adjusting motor.

18. The apparatus of claim 1, wherein the apparatus is a stairlift configured to transport a load from a first level to a second level.

* * * * *